United States Patent [19]

Styslinger

[11] 4,352,341
[45] Oct. 5, 1982

[54] WASTE HEAT BOILER AND STEAM SUPERHEATER SYSTEM

[75] Inventor: James R. Styslinger, Houston, Tex.

[73] Assignee: The M.W. Kellogg Company, Houston, Tex.

[21] Appl. No.: 251,616

[22] Filed: Apr. 6, 1981

[51] Int. Cl.³ .............................................. F22D 1/00
[52] U.S. Cl. .................................... 122/7 R; 122/32; 165/81
[58] Field of Search .................. 122/32, 34, 510, 7 R; 165/81, 82, 83, 159

[56] References Cited

U.S. PATENT DOCUMENTS

| | | | |
|---|---|---|---|
| 2,967,515 | 1/1961 | Hofstede et al. | 122/7 R |
| 3,850,231 | 11/1974 | Creek | 165/83 |
| 4,074,660 | 2/1978 | Tsau | 122/32 |
| 4,098,324 | 7/1978 | Kummel et al. | 122/7 R X |
| 4,148,281 | 4/1979 | Stoll et al. | 122/32 |

Primary Examiner—Edward G. Favors

[57] ABSTRACT

A system for producing superheated steam includes a waste heat boiler, a steam drum and a superheater. A process stream is utilized to provide the heat necessary to produce the steam and superheated steam. A floating head design is employed in both the waste heat boiler and the superheater.

10 Claims, 2 Drawing Figures

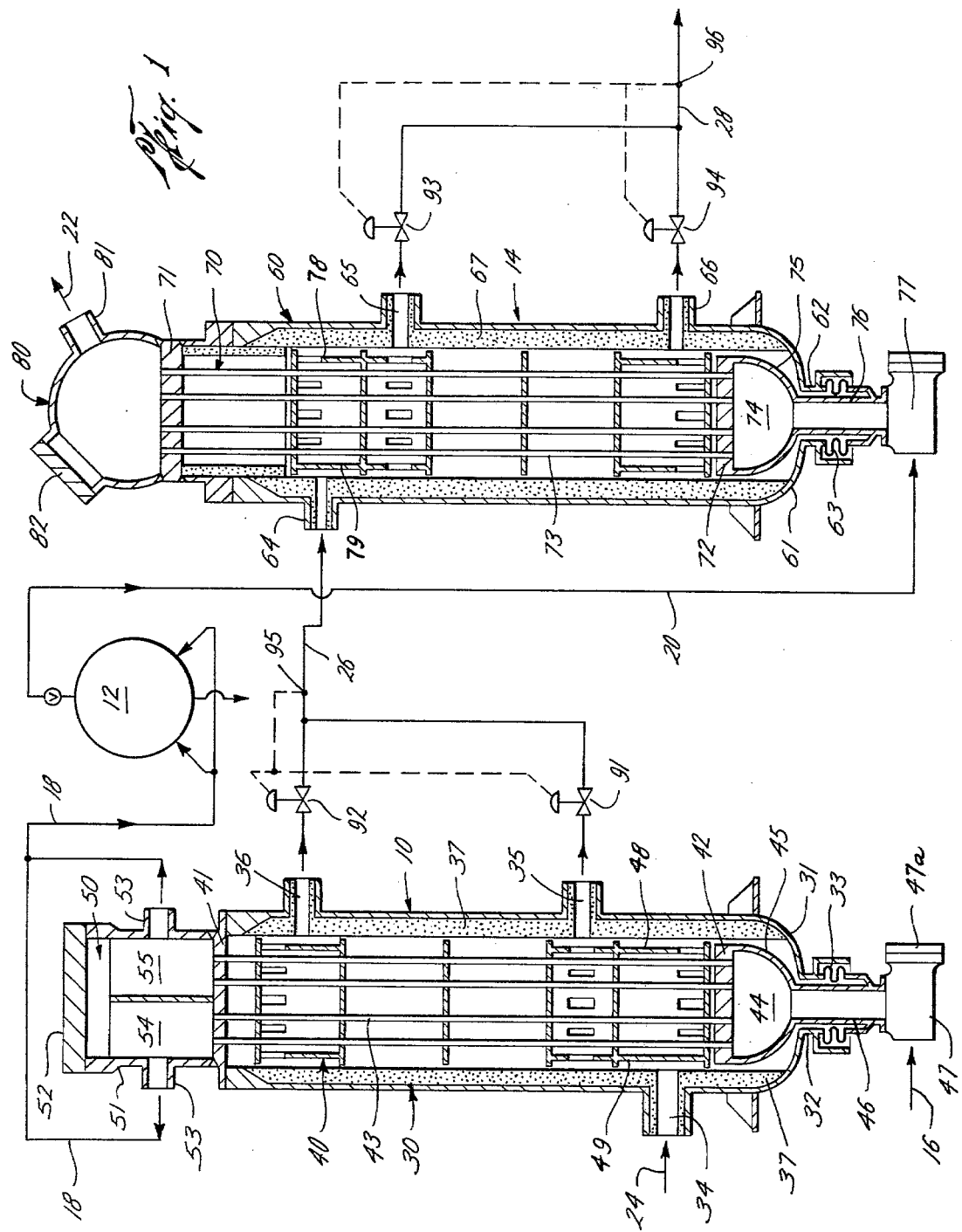

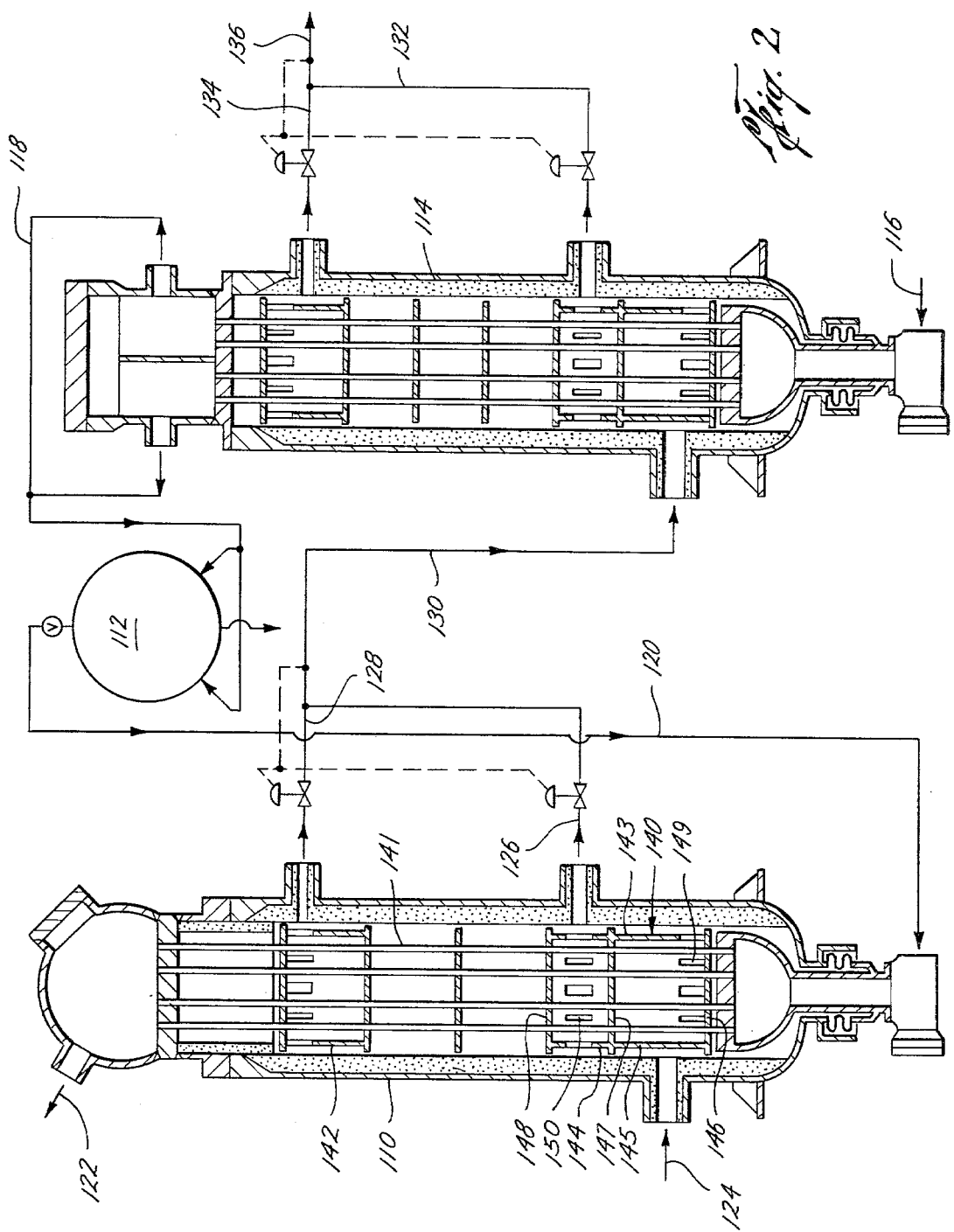

WASTE HEAT BOILER AND STEAM SUPERHEATER SYSTEM

The present invention is directed to an improved design of a waste heat boiler and a steam superheater. More specifically, the invention involves a floating head design of a waste heat boiler and a steam superheater in a system for producing superheated steam in an ammonia process.

The recovery of heat in an ammonia process is conventionally accomplished by the indirect exchange with water to form steam. U.S. Pat. No. 3,441,393 discloses a conventional process wherein the secondary reformer effluent is indirectly exchanged with water in steam generators or waste heat boilers. In the process disclosed in U.S. Pat. No. 3,441,393, the steam is superheated in a coil in the primary reformer furnace. On the other hand, U.S. Pat. No. 4,213,954 discloses the secondary reformer effluent in indirect exchange with water in a boiler, with steam in a steam superheater and then water in another boiler. Neither of these patents, however, disclose any specific mechanical design for these heat exchangers.

The mechanical design of the waste heat boiler used commercially in the process disclosed in U.S. Pat. No. 3,441,393 has been a bayonet design. Another mechanical design is the proprietary Borsig waste heat boiler which is a tube bundle in a shell design.

Heat exchangers used for other services than as waste heat boilers have employed a floating head design. U.S. Pat. No. 4,127,389 discloses an exchanger reactor with a floating head and expansion joint within the shell. A floating head exchanger with the expansion joint in the shell has been employed as a carbon dioxide stripper in an ammonia plant.

The present invention is directed to a system for producing superheated steam in a process plant, preferrably an ammonia plant, wherein the waste heat boiler and steam superheater have a unique design and the process stream is used to supply the heat to produce the steam and superheated steam.

Preferred embodiments of the invention are described, by way of example, with reference to the accompanying drawings in which:

FIG. 1 is a schematic view of the present invention wherein the waste heat boiler first receives the process stream followed by passing the process stream through the steam superheater; and FIG. 2 is a schematic view of the present invention wherein the steam superheater first receives the process stream followed by passing the process stream through the waste heat boiler.

In a process for the production of hydrogen-rich gas for producing ammonia such as disclosed in U.S. Pat. No. 3,441,393, steam is produced by indirect heat exchange with the effluent from the secondary reformer. As is also disclosed, the steam is superheated and used in turbines to produce the power necessary to run the various pieces of operating equipment. The present invention is directed to a unique waste heat boiler and steam superheater and a system for producing the superheated steam in a process plant, such as associated with the process stream for the production of a hydrogen-rich gas in the production of ammonia.

Referring to FIG. 1, a system for producing superheated steam comprises a waste heat boiler 10, a steam drum 12 and a steam superheater 14, as the major equipment items. Feed water is introduced by line 16 to the water inlet of waste heat boiler 10 and the steam produced is removed by lines 18 which passes the steam to steam drum 12. Steam is passed by line 20 to the steam inlet of steam superheater 14. The superheated steam produced in steam superheater 14 is removed by line 22. In this embodiment, the process stream 24 is first introduced to the waste heat boiler 10, which provides a heat sink for the high temperature process stream, and then by line 26 passes to the steam superheater 14. The effluent process stream from the steam superheater 14 is removed by line 28.

The waste heat boiler 10 is comprised of a shell 30, a tube bundle 40 within the shell 30 and a head 50 at the upper end of shell 30. The lower end 31 of shell 30 has a portion of reduced corss section 32. In the reduced cross section 32 of the shell 30 is an expansion section or joint 33. A process stream 24, which may be the effluent from a secondary reformer and thus at a pressure in excess of 30 atmospheres and at a temperature in excess of 975° C., is introduced to the shell 30 by inlet nozzle 34 as the shell side hot stream. This stream is cooled and exits by outlet nozzle 35 or nozzle 36. Internally of the shell 30 is a layer of insulation 37, preferably a castable liner with a metal innerliner, which covers the cyclindral wall of shell 30 as well as extends into the lower and 31 and the inlet nozzle 34 and outlet nozzles 35 and 36. The insulation 37 may be a casted bubble alumina material.

Tube bundle 40 is comprised of an upper tube sheet 41 and a lower tube sheet 42 with a bundle of tubes 43 extending between tube sheets 41 and 42. The bundle of tubes 43 may be in excess of 300 tubes. The lower tube sheet 42 is the upper portion of a floating head 44 which has a hemispherical or dish shaped lower portion 45. A pipe 46 is attached to the bottom of the lower portion 45 of floating head 44 and extends through the portion of reduced cross section 32 of shell 30 which contains the expansion joint 33. At the end of pipe 46 is an inlet tee 47 which receives feed water from line 16 and may have an access manway 47a at the other end. A cylindrical shroud 48 is positioned internally of shell 30 and extends above outlet nozzle 35 and below inlet nozzle 34. The inlet or lower portion of shroud 48 has a solid surface 49 which extends on either side of the nozzle 34 to prevent the process stream entering inlet nozzle 34 from directly impinging on the tubes of tube bundle 40. The remaining part of the lower portion of shroud 48 has a plurality of openings which pass the process stream radially inwardly and then distributes the stream upwardly so as to pass cocurrently with the water in the tubes of tube bundle 40. The outlet or upper portion of shroud 48 has a plurality of openings so that a portion of the process stream may be removed radially outwardly from the tubes around the entire circumference of the upper portion of shroud 48 and then be removed through outlet nozzle 35.

At the top of waste heat boiler 10 is a head 50 which is hollow. The shape of head 50 may be cylindrical or hemispherical. The head 50 may be secured by welding to upper tube sheet 41 which in turn is attached to shell 30 by bolts or other means (details not shown) which pass through upper tube sheet 41. As illustrated in FIG. 1, head 50 is comprised of a cylindrical body 51 which seats on and is welded to upper tube sheet 41 and has, for access to the tube bundle 43, a removable top 52 at the other end. Spaced in an equidistant pattern around the body 51 are a plurality of outlets 53. If there are four (4) outlets 53, internal separation walls 54 and 55 divide the hollow portion of head 50 in four equal sections.

The shell 30 of waste heat boiler 10 may have a water jacket (not shown) which extends below inlet nozzle 34 and above outlet nozzle 36. The water jacket provides an outer protection to the shell 30 in the event the insulation 37 is penetrated by the process stream. In normal operation the shell 30 does not require the exchange capability of the water jacket 59 and is shown as an optional safety feature.

The steam superheater 14 of the present invention, which also has the floating head design features similar to the waste heat boiler 10, is comprised of a shell 60, a tube bundle 70 within shell 60, and a head 80 at the upper end of shell 60. The lower end 61 of shell 60 has a portion of reduced cross section 62. In the reduced cross section 62 of the shell 60 is an expansion joint 63. The process effluent stream 26 from the waste heat boiler 10 is introduced to the shell 60 by inlet nozzle 64. This effluent stream 26 may have a pressure still in excess of 30 atmospheres and a temperature in excess of 975° C. The design of both waste heat boiler 10 and steam superheater 14 is such that while capable of handling high temperature and high pressure streams, the pressure drop within each ranges as low as 0.5 to 2 atmospheres. On the other hand, the process stream temperature may decrease passing through both the waste heat boiler 10 and steam superheater 14 greater than 300° to 500° C. The effluent stream 26 is introduced to the shell 60 as the shell side hot stream and flows downwardly while cooled and exits by outlet nozzles 65 and 66. Internally of the shell 60 is a layer of insulation 67 which covers the cylindrical wall of shell 60 as well as extends into the lower end 61. The insulation 67 also extends into inlet nozzle 64 and outlet nozzles 65 and 66 so that the shell wall is insulated from the high process stream temperature.

Tube bundle 70 is comprised of an upper tube sheet 71 and a lower tube sheet 72 with a bundle of tubes 73 extending between tube sheets 71 and 72. The bundle of tubes 73 may be in excess of 500 tubes and range between 300 and 1000 tubes. The lower tube sheet 72 is the upper portion of a floating head 74 which has a hemispherical or dish shaped lower portion 75. A pipe 76 is attached to the bottom of the lower portion 75 of the floating head 74 and extends through the portion of reduced cross section 72 of shell 60 which contains the expansion joint 63. At the end of pipe 76 is a steam inlet tee 77 which receives the steam from steam drum 12 and passed by line 20 to the inlet tee 77. The steam then passes through pipe 76 to the floating head 74 wherein it passes upwardly through tubes 73 to be superheated. A cylindrical shroud 78 is positioned internally of shell 60 and extends above the inlet nozzle 64 and below the outlet nozzle 65. The upper portion of shroud 78 has a solid surface 79 which extends on either side of inlet nozzle 64 to prevent process stream 26 from directly impinging on the tubes 73 of tube bundle 70. The shroud 78, except for the solid surface 79, has opening which directs the stream radially inwardly and then distributing this stream upwardly so as to pass countercurrently with the steam in the tubes 73 of tube bundle 70. The upper portion of the shroud 78 has a plurality of openings axial to the shell 60 so that a portion of the process stream may be removed from the tube bundle 70 radially around the entire shroud 78 and then be removed through outlet nozzle 65.

At the top of steam superheater 14 is a hollow head 80. The shape of head 80 may be hemispherical or cylindrical and may be attached to shell 60 in a variety of ways. As illustrated in FIG. 1, head 80 is hemispherical and is attached such as by welding to upper tube sheet 71 which in turn is attached to shell 60 by bolts or other means (not shown). Head 80 has a superheated steam outlet 81 which is adapted for connection to line 22. The head 80 may also have a manway 82 wherein for ease of maintenance and repair access may be had to the tubes 73.

To control the operation of the waste heat boiler 10 and the steam superheater 14, valves 91, 92, 93 and 94 are placed in the lines of exit nozzles 35, 36, 65 and 66 respectively. By means of a controller 95 in effluent stream 26 or controller 96 in effluent stream 28 control of the amounts of effluents leaving exit nozzles 35 and 36 or exit nozzles 65 and 66 are respectively controlled. In the FIG. 1 embodiment, the controller 95 effectively controls the temperature of the effluent stream 28 while the controller 96 controls the temperature of the superheated steam exiting by line 22.

Referring to FIG. 2, a second embodiment of a waste heat boiler and steam superheater is illustrated. In this embodiment the relation of waste heat boiler and steam superheater is reversed in relation to the process stream providing the heat to produce the steam and then superheat the steam. In this embodiment, the process stream first passes through the steam superheater and subsequently, through the waste heat boiler. The mechanical design employed for both the waste heat boiler and the steam superheater are essentially identical to that described in the embodiment of FIG. 1 with the exception that the steam superheater utilizes cocurrent flow rather than counter-current flow. In this embodiment the control is more direct in that the amount of exchange within the superheater directly controls the temperature of the superheated steam and the amount of exchange within the waste heat boiler directly controls the temperature of the effluent process stream. However, in the event of steam circulation failure, this embodiment does not have the same flexibility as that in FIG. 1.

Thus, as illustrated in FIG. 2, a system for producing superheated steam comprises a steam superheater 110, a steam drum 112 and a waste heat boiler 114, as the major equipment items. Feed water is introduced by line 116 to the inlet of waste heat boiler 114 and the steam produced is removed by line 118 and is passed to steam drum 112. Steam is removed from steam drum 112 by line 120 wherein it is passed to the inlet of steam superheater 110. The superheated steam produced in superheater 110 is removed by line 122. The process stream 124, in this embodiment of FIG. 2, is first introduced to the steam superheater 110 as the hot shell side stream and is removed in two exit streams 126 and 128 and combined in line 130. The combined effluent stream in line 130 is introduced to the waste heat boiler 114 as the hot shell side fluid where it is removed by two exit streams 132 and 134 which are combined in line 136.

In describing the shrouds 48 and 78 in the waste heat boiler 10 and the steam superheater 14, specific details of the shroud were not given but only its function. One embodiment of the shrouds used in the present invention is illustrated in both FIG. 1 and FIG. 2 and described more fully with respect to steam superheater 110. The steam superheater 110 has a shroud 140 which encircles the tube bundle 141 and extends from below the inlet of process stream 124 to above the first exit stream 126. A second shroud 142 extends above and below the second exit stream 128.

The shroud 140 is illustrated as a single shroud but may be two separate shrouds, a shroud or lower portion 143 and shroud or upper portion 144. Shroud 143 has a solid plate 145 which extends above and below and on either side so that the incoming stream cannot impinge upon the tubes in tube bundle 141. Shroud 143 has a lower ring 146 and an upper ring 147. Likewise, shroud 144 has a lower ring 147 and an upper ring 148. Ring 147 would be two separate rings if the shrouds were separate shrouds. Between the rings 146 and 147 are a plurality of slots or holes 149 which except for solid plate 145 extend around the shroud 143 which encircles the tube bundle 141. Thus, the stream entering the steam superheater 110 is maintained between rings 146 and 147 and diverted around the entire tube bundle 141 whereby it is directed radially through the slots or holes 149 and then upwardly. Thus, shroud 143 acts as a protector of the tube bundle 141 as well as a distrubutor for the incoming stream. The shroud 144, on the other hand, has slots or holes 150 all around the circumference. The shell side stream is in contact with the tubes of tube bundle 141 and the function of shroud 144 is to obtain even distribution of the stream exiting to the first exit in the vessel. The stream exits radially outwardly and is maintained between rings 147 and 148 for removal in exit stream 126. This distribution of removal prevents temperature variations due to removal only on the nozzle side of the vessel. Shroud 142 is similar to shroud 144 and serves the same function. While it is preferred to have the second shroud 142 at the second exit nozzle or stream it is not necessary to have such a shroud. The shrouds are an example of distribution means which may be employed in both the waste heater boilers and steam superheaters of the present invention.

The floating head design of both the waste heat boiler and steam superheater of the present invention has the advantage of an efficient and cost-effective arrangement for producing superheated steam in an ammonia plant. The floating head design provides the necessary mechanical requirements for operation over extrememly wide temperature ranges and low pressure drops while providing a design having the essential characteristics necessary for good maintenance and repair.

The nature and objects of the present invention having been completely described and illustrated and the best mode thereof set forth, what I wish to claim as new and useful and secure by Letters Patent is:

1. In a system comprising a waste heat boiler, a steam drum, a steam superheater, means for passing water through said waste heat boiler to produce steam, means for passing the steam to said steam drum, means for passing steam from said steam drum through said steam superheater to produce superheated steam and means for passing a process stream through the shell of said waste heat boiler, the improvement which comprises:
   a waste heat boiler comprising
      a shell having at the lower end a portion of reduced cross-section containing an expansion joint,
      a tube bundle within said shell, the top of said bundle affixed to said shell and the bottom being a hollow floating head,
      a head at the upper end of said shell having a plurality of steam outlets,
      pipe means attached to said floating head, said pipe means extending through said lower end portion of reduced cross-section of said shell and attached to said shell below said expansion joint for introducing water to said tubes of said tube bundle,
      inlet means in said shell for passing a process stream in indirect cocurrent exchange with the water in said tubes, and
      outlet means in said shell for removal of said process stream.

2. A system according to claim 1 wherein said steam superheater comprises
   a shell having at one end a portion of reduced cross-section containing an expansion joint,
   a tube bundle within said shell, one end of said bundle attached to said shell and the other end attached to a floating head,
   a head at the other end of said shell,
   pipe means attached to said floating head which extend through said expansion joint and attach to the end of said shell, and
   inlet and outlet means in said shell for passing a process stream in indirect exchange with the steam in said tubes of said tube bundle.

3. A system according to claim 2 wherein the process stream passes first through said shell of said waste heat boiler and then that stream passes through the shell of said steam superheater.

4. A system according to claim 2 wherein the process stream passes first through said shell of said steam superheater and then that stream passes through the shell of said waste heat boiler.

5. A system according to claim 1 wherein said outlet means in said shell of said waste heat boiler includes two outlets for controlling the temperature of said process stream effluent.

6. A floating head exchanger comprising
   a shell having at the lower end a portion of reduced cross-section containing an expansion joint,
   a tube bundle within said shell, the top of said bundle affixed to said shell and the bottom being a hollow floating head,
   a head at the upper end having a plurality of steam outlets,
   pipe means attached to said floating head, said pipe means extending through said lower end portion of reduced cross-section of said shell and attached to said shell below said expansion joint for introducing fluid to the tubes of said tube bundle,
   inlet means in said shell for passing a process stream in indirect exchange with the fluid in said tubes,
   first and second outlet means in said shell, each for removal of a portion of said process stream, and
   distribution means encircling said tubes of said tube bundle and adjacent said inlet means and said first outlet means for directing said process stream radially inwardly and then along said tubes of said tube bundle and then removing a portion radially outwardly for removal through said first outlet means.

7. A floating head exchanger according to claim 6 wherein said distribution means is a shroud having a solid surface adjacent said inlet means to prevent impingment on said tubes.

8. A floating head exchanger according to claim 6 wherein the shell is vertical and said inlet means is near the bottom of the tubes of said tube sheet and said first outlet means is intermediate said inlet means and said second outlet means which is near the top of said tubes of said tube sheet.

9. A floating head exchanger according to claim 6 wherein the shell is vertical and said inlet means is near the top of the tubes of said tube sheet and said first outlet means is intermediate said inlet means and said second outlet means which is near the bottom of said tubes of said tube sheet.

10. A floating head exchanger according to claim 6 which further includes control means for controlling the amount of said process stream which exits said first and said second outlet means respectively.

* * * * *